United States Patent
Park et al.

(10) Patent No.: US 8,750,871 B2
(45) Date of Patent: Jun. 10, 2014

(54) NETWORK CONNECTION METHOD FOR MOBILE TERMINAL IN ASYNCHRONOUS MOBILE COMMUNICATION SYSTEM

(75) Inventors: Chan Won Park, Gumi-si (KR); Jung Wan Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 914 days.

(21) Appl. No.: 12/264,382

(22) Filed: Nov. 4, 2008

(65) Prior Publication Data
US 2009/0116441 A1    May 7, 2009

(30) Foreign Application Priority Data
Nov. 7, 2007  (KR) .................. 10-2007-0113010

(51) Int. Cl.
H04W 4/00    (2009.01)
(52) U.S. Cl.
USPC .................. 455/435.2; 455/435.1; 455/435.3; 455/436; 455/437
(58) Field of Classification Search
USPC .............................................. 455/435.1–437
See application file for complete search history.

(56) References Cited

U.S. PATENT DOCUMENTS

| | | | |
|---|---|---|---|
| 5,903,832 A * | 5/1999 | Seppanen et al. | 455/435.3 |
| 5,920,821 A * | 7/1999 | Seazholtz et al. | 455/466 |
| 2002/0123340 A1 * | 9/2002 | Park | 455/424 |
| 2003/0129971 A1 * | 7/2003 | Gopikanth | 455/414 |
| 2004/0152462 A1 | 8/2004 | Hwang | |
| 2004/0224684 A1 * | 11/2004 | Dorsey et al. | 455/434 |
| 2006/0079224 A1 * | 4/2006 | Welnick et al. | 455/432.1 |
| 2006/0187873 A1 * | 8/2006 | Friday et al. | 370/328 |
| 2006/0264227 A1 * | 11/2006 | Takahashi et al. | 455/513 |
| 2007/0270148 A1 * | 11/2007 | Yeh et al. | 455/436 |
| 2008/0096559 A1 * | 4/2008 | Phillips et al. | 455/435.2 |

FOREIGN PATENT DOCUMENTS

| | | | |
|---|---|---|---|
| KR | 10-2002-0055891 A | 7/2002 | |
| KR | 10-2004-0065860 A | 7/2004 | |

* cited by examiner

Primary Examiner — Kwasi Karikari
Assistant Examiner — Jaime Holliday
(74) Attorney, Agent, or Firm — Jefferson IP Law, LLP

(57) ABSTRACT

A network connection method for an asynchronous mobile terminal is provided for reducing connection latency and power consumption. A network connection method for an asynchronous mobile terminal includes displaying a list of operators identified by scanning frequencies in a manual network selection mode, acquiring, when one of the operators is selected from the list, synchronization through a frequency of the selected operator, and connecting to a network through the frequency for receiving a service. The network connection method enables a mobile terminal to select an operator network through a single frequency scanning process unlike the convention method which performs frequency scanning twice, thereby reducing connection latency and power consumption of the mobile terminal.

4 Claims, 3 Drawing Sheets

NETWORK CONNECTION METHOD FOR MOBILE TERMINAL IN ASYNCHRONOUS MOBILE COMMUNICATION SYSTEM

PRIORITY

This application claims the benefit under 35 U.S.C. §119(a) of a Korean patent application filed in the Korean Intellectual Property Office on Nov. 7, 2007 and assigned Serial No. 2007-0113010, the entire disclosure of which is hereby incorporated by reference.

BACKGROUND OF THE INVENTION

1. Field of the Invention

The present invention relates to an asynchronous mobile communication system. More particularly, the present invention relates to a network connection method for a mobile terminal in an asynchronous mobile communication system that is capable of reducing connection latency and power consumption.

2. Description of the Related Art

Typically, in asynchronous mobile communication systems such as Global System for Communication (GSM), General Packet Radio Service (GPRS), and Universal Mobile Telecommunications System (UMTS), a mobile terminal acquires synchronization with a network during a network connection procedure. This is, when a mobile terminal is turned on, it scans frequencies and measures received signal strengths on the frequencies. If a best frequency is detected in accordance with the received signal strengths, the mobile terminal attempts to acquire synchronization with the network operating in the frequency band. After acquiring synchronization, the mobile terminal is served by the network.

In a conventional automatic network connection method, the mobile terminal performs frequency scan (power scan in GSM) and measures signal strengths of the frequencies. If a frequency having signal strength greater than a preset value is detected, the mobile terminal performs synchronization with the network on the frequency.

A conventional manual network connection method generates a list of frequencies as the result of the frequency scanning and signal strengths in order for a user to select one of the frequencies. If a frequency is selected from the list, the mobile terminal performs the frequency scan again. At this time, the mobile terminal scans the frequencies having the same operator ID as the selected frequency and selects one of the scanned frequencies. If a frequency is selected, the mobile terminal performs synchronization with the network.

In the conventional manual network connection method, the mobile terminal performs the frequency scanning twice when the user selects an operator. Specifically, the frequency scanning is performed on all frequency bands and is then performed on the frequencies in one of the frequency bands. However, such repeated frequency scanning increases network connection latency and power consumption of the mobile terminal.

Therefore, a need exists for an improved network connection method for a mobile terminal in an asynchronous mobile communication system capable of reducing connection latency and power consumption.

SUMMARY OF THE INVENTION

An aspect of the present invention is to address at least the above-mentioned problems and/or disadvantages and to provide at least the advantages described below. Accordingly, an aspect of the present invention is to provide a network connection method for a mobile terminal, particularly in the asynchronous mobile communication system, capable of reducing network connection latency.

Another aspect of the present invention is to provide a manual network connection method for a mobile terminal that is capable of reducing power consumption.

Still another aspect of the present invention is to provide a network connection method for a mobile terminal that is capable of make a connection to a specific operator's network with a single channel scanning process.

In accordance with an aspect of the present invention, a network connection method for an asynchronous mobile terminal is provided. The method includes displaying a list of operators identified by scanning frequencies in a manual network selection mode, acquiring, when one of operators is selected from the list, synchronization through a frequency of the selected operator, and connecting to a network through the frequency for receiving a service.

In accordance with another aspect of the present invention, a network connection method for a GSM mobile terminal is provided. The method includes displaying a list of Public Land Mobile Networks (PLMNs) identified by power scanning process on frequencies in a manual network selection mode, acquiring, when one of PLMNs is selected from the list, synchronization through a frequency of the selected PLMN, and connecting to a network through the frequency for receiving a service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In exemplary embodiments of the present invention, a network connection method of a mobile terminal is described in association with GSM. However, the present invention is not limited thereto. For example, the network connection method of the present invention can be applied to the GPRS, UMTS, and other cellular communication systems.

Figure 1:
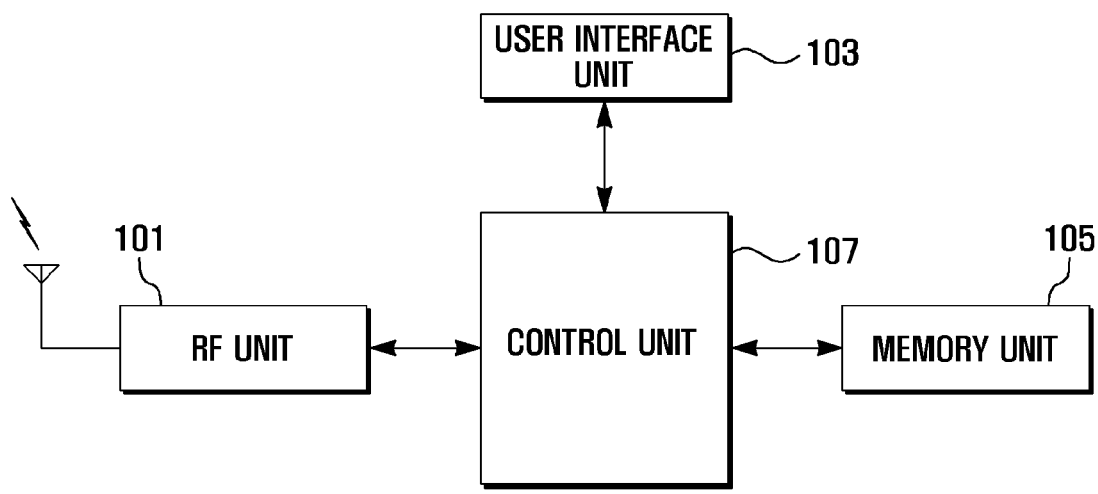
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention. The mobile terminal is an asynchronous communication terminal, particularly, a GSM terminal.

Referring to FIG. 1, the mobile terminal includes a Radio Frequency (RF) unit 101, a user interface unit 103, a memory unit 105, and a control unit 107.

The RF unit 101 is responsible for radio communication of the mobile terminal. The RF unit 101 includes an RF transmitter for up-converting and amplifying a signal to be transmitted and an RF receiver for low noise amplifying and down-converting a signal received through an antenna. In a manual network connection mode, the RF unit 101 scans available operators' frequency bands. That is, the RF unit 101 performs a power scan. If a specific operator's network is selected from the scanning result displayed on the user interface unit 103, the RF unit 101 acquires synchronization with the network on the corresponding frequency.

The user interface unit 103 includes a key input means and a display means. The user interface unit 103 receives a key input through the key input means and displays information about operation status and activated functions of the mobile terminal on the display means. More particularly, in this exemplary embodiment, the user interface unit 103 is configured such that the user can select an operator in the manual network selection mode. The user interface unit 103 displays a list of operators in priority order.

The memory unit 105 stores application programs and data required for operating the mobile terminal. The memory unit 105 stores the list of the operators obtained as the result of the frequency scanning in the manual network selection mode. The memory unit 105 saves the operator ID of the network selected from the list.

The control unit 107 controls the operations of the internal components of the mobile terminal. The control unit 107 controls the network connection, e.g. the automatic and manual network selection functionalities. When the mobile terminal operates in the manual network selection mode, the control unit 107 performs the frequency scan (power scan for GSM and full scan for WCDMA) and creates a list of operators. The list is formed in the order of the signal powers of the frequency bands of the operators' networks. If a specific operator is selected from the list by the user, the control unit 107 stores the corresponding operator ID in the memory unit 105. The control unit 107 controls to acquire synchronization on the frequency of the selected operator's network to be served by the network.

A network connection procedure of the above structured mobile terminal is described hereinafter in terms of internal signaling of the mobile terminal.

Figure 2:
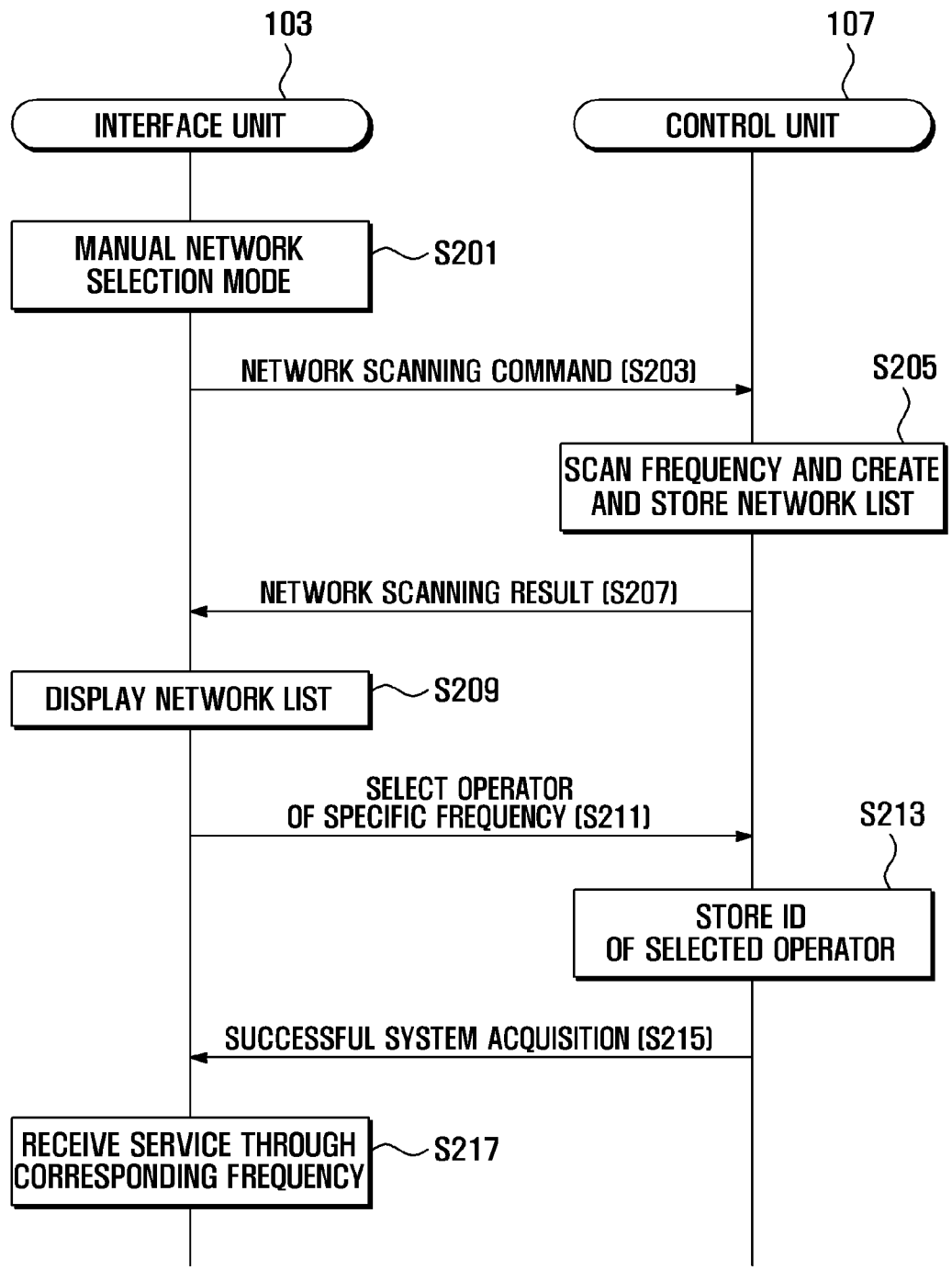
FIG. 2 is a message flow diagram illustrating a network connection method according to an exemplary embodiment of the present invention.

FIG. 2 is a message flow diagram illustrating a network connection method according to an exemplary embodiment of the present invention.

Referring to FIGS. 1 and 2, a user selects a GSM manual network selection mode through the user interface unit 103 in step S201. In an exemplary embodiment, the selectable network selection modes may be displayed on the display means of the user interface unit 103 such that the user can select one of the network selection modes using the key input means.

If the manual network selection mode is selected, the user interface unit 103 sends a network scanning command to the control unit 106 in step S203. Upon receipt of the network scanning command, the control unit 106 controls to scan frequencies in the vicinity of the user and creates and stores a list of the networks retrieved as the result of the frequency scanning in step S205. In the case of a GSM terminal, the mobile terminal measures the signal strengths of the scanned frequencies and forms the list in priority order of the signal strengths. The list is stored in the memory unit 105.

Although the operators' networks are listed in priority order of signal strength in this exemplary embodiment, the present invention is not limited thereto. The list can be formed in priority of other factors according to the type of an identity card inserted within the mobile terminal such as Subscriber Identity Module (SIM) and Universal SIM (USIM) cards. For example, the mobile terminal can be set such that a specific operator network, i.e. Home Public Land Mobile Network (HPLMN) with which the user has subscribed or a Registered PLMN (RPLMN), is listed with the highest priority.

Next, the control unit 107 sends the scanning result to the user interface unit 103 in step S207, and the user interface unit 103 displays a network list created according to the scanning result in step S209.

The user interface unit 103 receives a user input while displaying the network list and sends a network selection message indicating an operator network of a specific frequency selected by the user in step S211. Upon receipt of the selection message, the control unit 107 stores the operator ID and performs synchronization at the frequency of the selected operator network in step S213. That is, the control unit 107 performs synchronization with the operator network selected from the list immediately.

If the control unit 107 acquires synchronization with the network, it informs the user interface unit 103 of the synchronization acquisition in step S215, such that the user interface unit 103 provides services on the frequency of the selected network in step S217.

Figure 3:
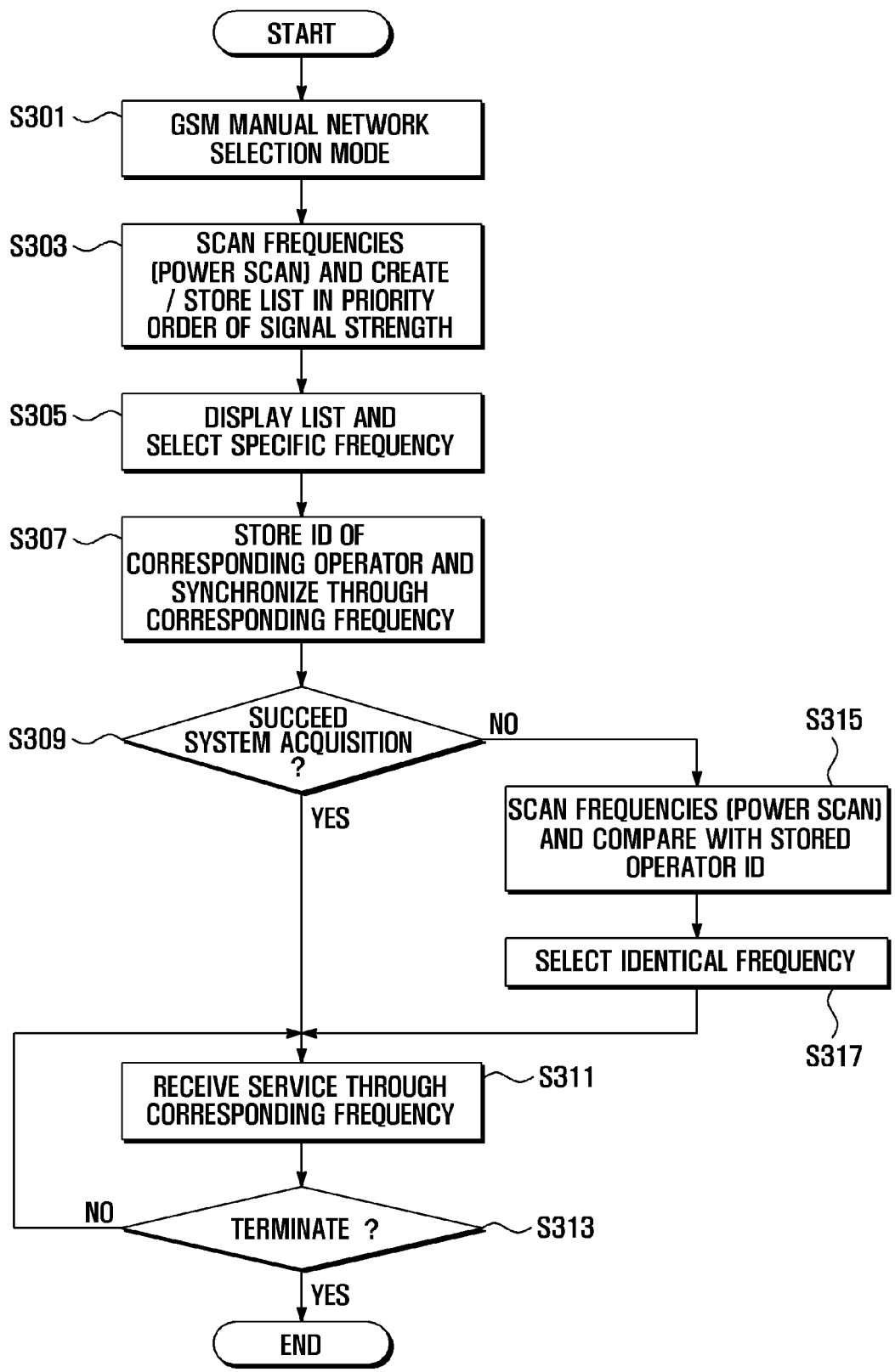
FIG. 3 is a flowchart illustrating a network connection method for a mobile terminal in an asynchronous mobile communication network according to an exemplary embodiment of the present invention.

FIG. 3 is a flowchart illustrating a network connection method for a mobile terminal in an asynchronous mobile communication network according to an exemplary embodiment of the present invention.

Referring to FIG. 3, the control unit 107 of the mobile terminal detects the activation of the manual network selection mode in step S301. If it is detected that the mobile terminal operates in the manual network selection mode, the control unit 107 performs frequency scanning and creates and stores a list of networks (PLMNs) in priority order of signal strength in step S303. Typically, a GSM terminal supports multiple frequency bands of 850 MHz, 900 MHz, 1800 MHz, and 1900 MHz. The control unit 107 scans all frequency bands and then frequencies of each frequency bands. The control unit 107 measures signal strengths of the frequencies and creates the list in priority order of the signal strength. Then, the control unit 107 stores the list in the memory unit 105.

Next, the control unit 107 controls the user interface unit 103 to display the list on the display means to allow the user to select a specific frequency from the list in step S305. At this time, the user may select a specific PLMN. If a PLMN is selected, the control unit 107 stores the PLMN ID and performs synchronization on a frequency of the selected PLMN in step S307. The control unit 107 may perform the synchronization using the list and PLMN ID acquired at step S305 without repeating the frequency scanning process.

Next, the control unit 107 determines whether a system is successfully acquired in step S309. If a system is successfully acquired, the control unit 107 controls such that the mobile terminal connects to the system and receives service from the system in step S311. While the mobile terminal is served by the system, the control unit 109 determines whether a termination command is input in step S313. If a termination command is detected, the control unit 109 ends the service.

In contrast, if the system acquisition fails at step S309, the control unit 109 performs frequency scanning again as at step S303 and compares the PLMN ID of each frequency with the pre-stored PLMN IDs in step S315. As mentioned above, the conventional GSM mobile terminal operating in the manual network selection mode performs frequency scanning twice. However, it is not expected that the conventional GSM mobile terminal performs the above explained process because the system acquisition failure is not likely to occur due to the use of the PLMN ID stored in the mobile terminal.

Next, the control unit 107 selects a frequency of which PLMN ID is stored in the memory unit 105 in step S317 and then proceeds to step S311.

The asynchronous mobile terminal and network connection method of the present invention is not limited to the above described exemplary embodiments but can be adapted for other exemplary embodiments within the scope of the accompanying claims.

Although the network connection method is described in association with a GSM mobile terminal, the present invention is not limited thereto. For example, the network connection method of the present invention can be adapted to various asynchronous mobile terminal such as GPRS and UMTS mobile terminals.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the network connection method of the present invention enables a mobile terminal to select an operator network through a single frequency scanning process unlike the convention method which performs frequency scanning twice, thereby reducing connection latency and power consumption of the mobile terminal.

What is claimed is:

1. A network connection method for an asynchronous mobile terminal, the method comprising:
   displaying a list of operators identified by scanning frequencies in a manual network selection mode, the list being displayed in a priority order of signal strengths, and storing the list of operators;
   acquiring, when one of the operators is selected by a user from the displayed list in the manual network selection mode, synchronization through a stored frequency of the selected operator without rescanning the frequency of the selected operator, wherein the acquiring of the synchronization comprises storing an identity of the selected operator; and
   connecting to a network through the frequency for receiving a service, wherein the connecting to the network comprises:
      re-scanning the frequencies if the connecting to the network fails; and
      connecting, if any of said re-scanned frequencies has the identity of the selected operator, to a network through the frequency having the identity of the selected operator.

2. A network connection method for a Global System for Communication (GSM) mobile terminal, the method comprising:
   displaying a list of Public Land Mobile Networks (PLMNs) identified by a power scanning process on frequencies in a manual network selection mode, the list being displayed in a priority order of signal strengths, and storing the list of PLMNs;
   acquiring, when one of the PLMNs is selected by a user from the displayed list in the manual network selection mode, synchronization through a stored frequency of the selected PLMN without rescanning the frequency of the selected PLMN, wherein the acquiring of the synchronization comprises storing an identity of the selected PLMN; and
   connecting to a network through the frequency for receiving a service, wherein the connecting to the network comprises:
      re-scanning powers of the frequencies if the connecting to the network fails; and
      connecting, if any of said re-scanned frequencies has the identity of the selected PLMN, to a network through the frequency having the identity of the selected PLMN.

3. A network connection method for an asynchronous mobile terminal, the method comprising:
   scanning frequencies and creating a list of networks in a priority order of signal strengths as the result of the scanning of the frequencies;
   displaying the list of networks to allow a user to select a specific network in a manual network selection mode, and storing the list of networks;
   acquiring, when one of the networks is selected by the user from the displayed list in the manual network selection mode, synchronization through a stored frequency of the selected network without rescanning the frequency of the selected network, wherein the acquiring of the synchronization comprises storing an identity of the selected network; and
   connecting to the selected network through the frequency for receiving a service, wherein the connecting to the selected network comprises:
      re-scanning the frequencies if the connecting to the selected network fails; and
      connecting, if any of said re-scanned frequencies corresponds to the selected network, to a network through the frequency corresponding to of the selected network.

4. The method of claim 3, wherein the priority order is further determined according to the type of an identity card inserted within the mobile terminal.

* * * * *